Figure 3:
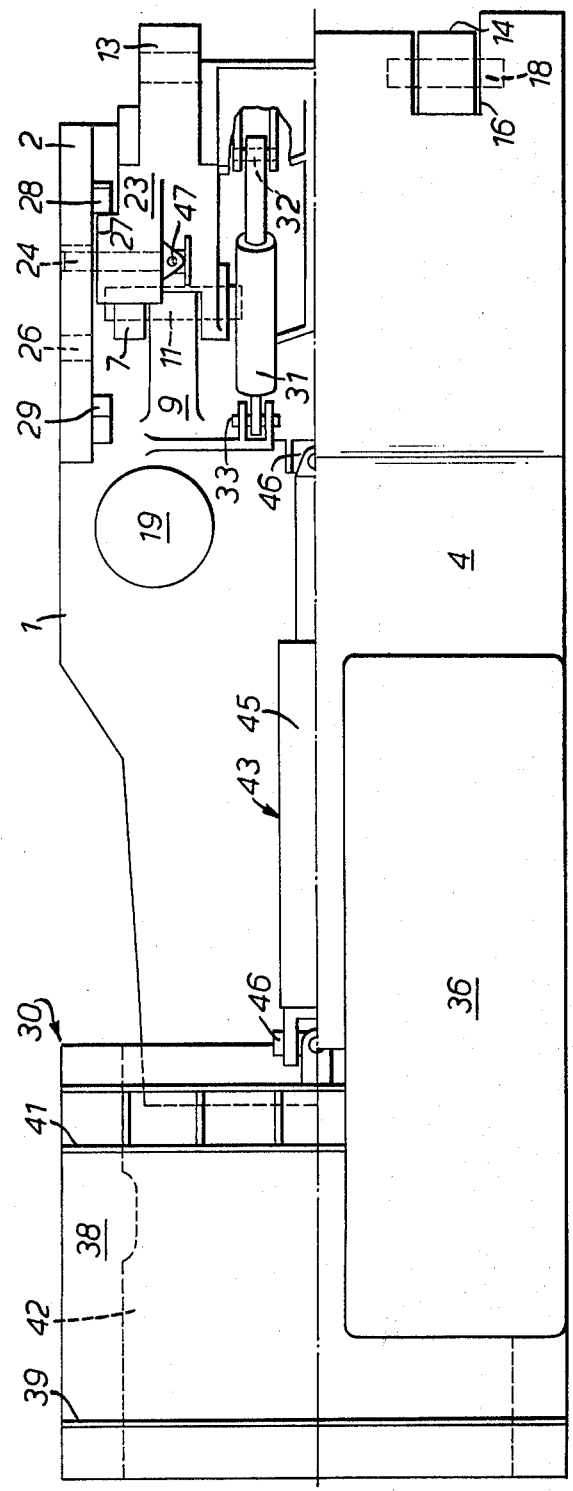

United States Patent [19]
Snowden et al.

[11] 3,885,396
[45] May 27, 1975

[54] MINE ROOF SUPPORTS

[75] Inventors: Eric McIvor Snowden; John Hirst Walker, both of Cheltenham, England

[73] Assignee: Dowty Mining Equipment Limited, Gloucestershire, England

[22] Filed: Apr. 23, 1973

[21] Appl. No.: 354,159

[30] Foreign Application Priority Data
Apr. 27, 1972  United Kingdom............... 19505/72

[52] U.S. Cl. ................................. 61/45 D; 248/357
[51] Int. Cl. ............................................ E21d 15/44
[58] Field of Search ................ 61/45 D; 299/31, 33; 91/170 MP; 248/357

[56] References Cited
UNITED STATES PATENTS
3,779,023  12/1973  Koppers.............................. 61/45 D FOREIGN PATENTS OR APPLICATIONS
1,934,376  3/1970  Germany ............................ 61/45 D
1,503,990  10/1967  France................................ 61/45 D Primary Examiner—Dennis L. Taylor
Attorney, Agent, or Firm—Young & Thompson

[57] ABSTRACT

A mine roof support comprising a floor beam, a roof lever pivotally mounted on the floor beam for engaging the roof, a variable length strut such as a hydraulic jack engaging pivotally between the floor beam and the roof lever at positions spaced from the pivot device and means to adjust the lever pivot on the floor beam to provide at least two separate pivoting positions for the roof lever.

The roof lever may carry a roof beam at its free end for engaging the roof.

6 Claims, 5 Drawing Figures

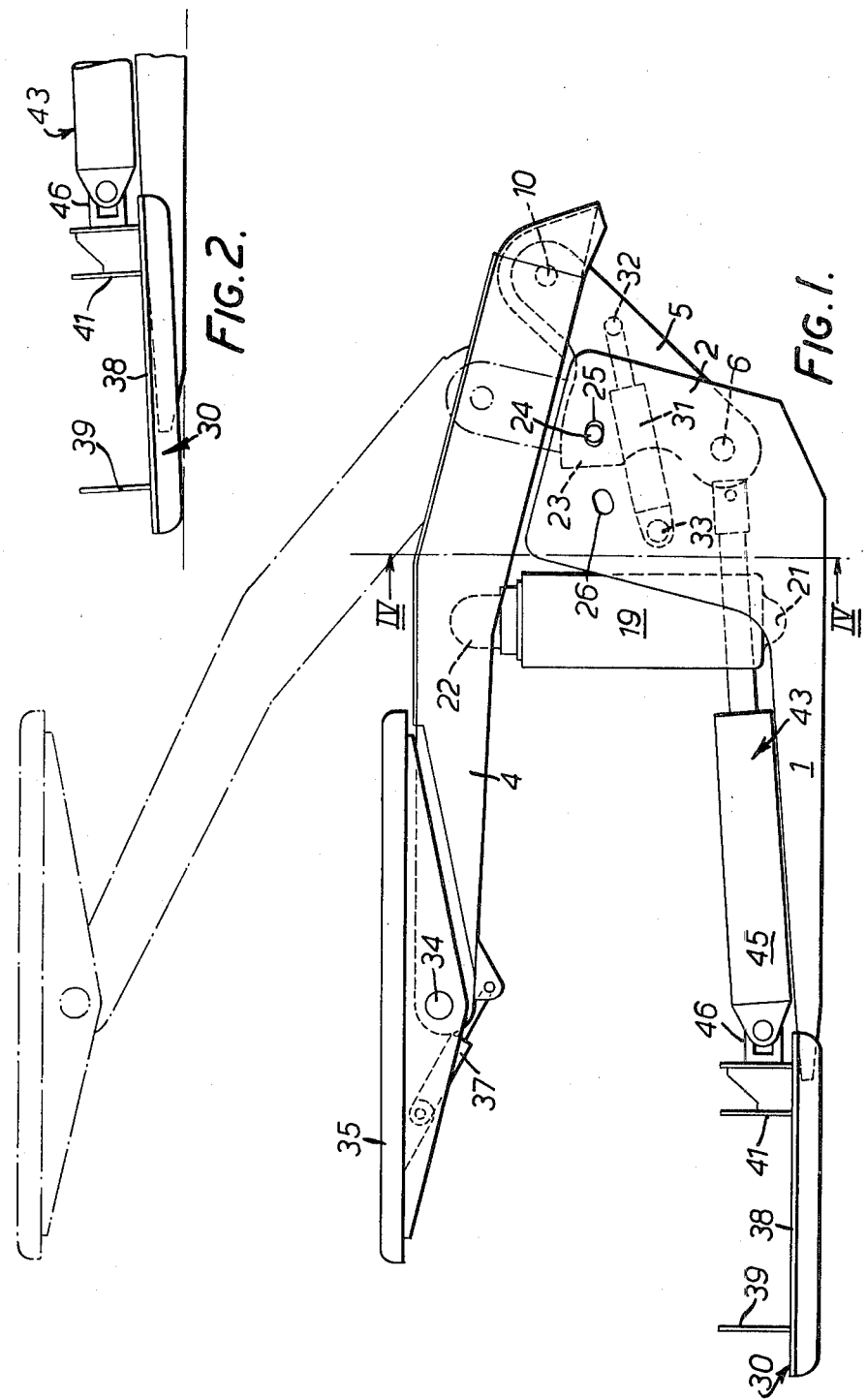

MINE ROOF SUPPORTS

This invention relates to a mine roof support of the kind in which a floor-engaging beam (hereinafter referred to as a floor beam) and a roof lever are secured together at adjacent end portions by means of a pivot, and a variable length strut such as a hydraulic jack acts between the floor beam and the roof lever at positions spaced from the pivot to vary the inclination between the floor beam and the roof lever. The lever may be of substantial width to form a shield.

Such a support operates to protect other mining apparatus which is located between the floor beam and the roof lever.

In accordance with the present invention a mine roof support comprises a floor beam, a roof lever, a pivot device pivotally mounting the roof lever on the floor beam and a variable length strut such as a hydraulic jack engaging pivotally with the floor beam and the roof lever at positions spaced from the pivot device to vary the inclination of the roof lever relative to the floor beam over an angular range whereby to vary the spacing between the free ends of the lever and shield remote from the pivot device, the pivot device being movable to provide at least two alternative fixed positions for the roof lever pivot. Preferably one of said fixed positions is closer to the free end of the roof lever when fully raised than the other fixed position.

The pivot device may comprise a link having a first pivot by which it is secured to the floor beam and a second pivot by which it is secured to the roof lever, the axes of the two pivots being parallel and spaced along the link, and locking means capable of locking the link at least in positions corresponding to the said two fixed positions for the roof lever pivot.

The locking means may act between the floor beam and the link.

The roof lever may include one or more roof beams pivotally secured thereto. Preferably each roof beam is pivoted centrally of its length to the free end portion of the roof lever.

A variable length strut such as a hydraulic jack may act between the or each roof beam and the roof lever to determine the angular setting between roof beams and roof lever.

The free end of the roof lever may extend near to the free end of the floor beam and the roof beam may extend considerably beyond the free end of the roof lever.

Both the roof lever and the link may be of suitable width so that each may form a shield.

Figure 4:
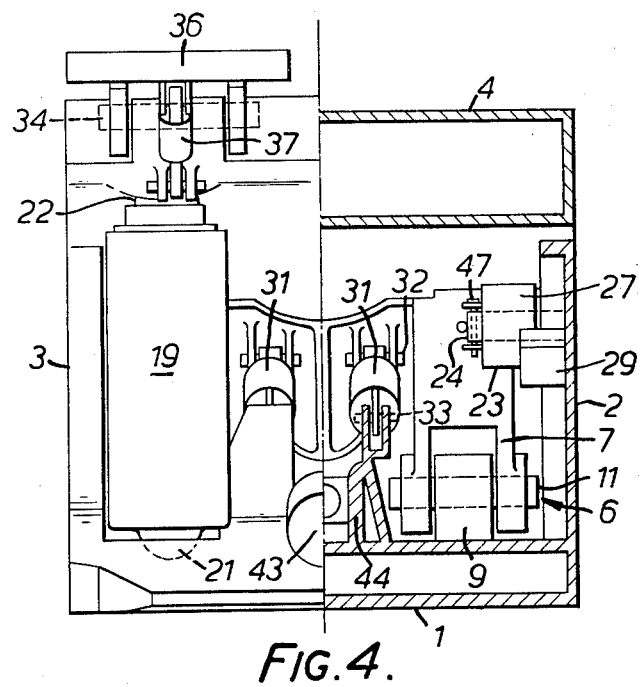
Figure 5:
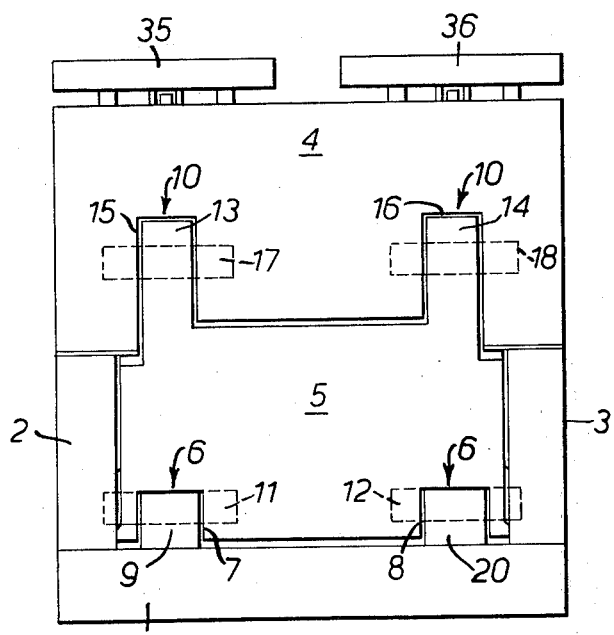

One embodiment of the invention will now be particularly described with reference to the accompanying drawings, in which:

FIG. 1 is a side elevation of the roof support,

FIG. 2 is a detail of FIG. 1 showing the operation as the support advances to the conveyor, FIG. 3 is a plan view of the support of FIG. 1, half of the figure having the roof lever removed to show the arrangement of link and floor beam underneath, FIG. 4, is a front elevation of the support of FIGS. 1 and 2, being partly in cross-section on the line IV-IV of FIG. 1, and FIG. 5 is an end elevation of the support of FIG. 1, showing the rear of the support.

The floor beam 1 is of conventional box girder construction and at the rear end thereof a pair of spaced projections 2 and 3 are provided which extend upwardly from the floor beam. The roof lever 4 is also of box girder construction and is pivotally mounted over the floor beam by means of a pivot device comprised by the link 5. The link 5 has two pivots 6 and 10 respectively to the floor beam and to the roof lever. For the pivot 6, the link is provided with a pair of similar bifurcated lugs 7 and 8, the structure of the lug 7 being shown clearly in FIG. 4. A projection 9 from the rear end portion of the floor beam enters the bifurcated projection 7 and a pivot pin 11 of substantial dimensions passes through suitable holes in the lug 7 and projection 9. A similar pin 12 and projection 20 are provided for the bifurcated lug 8. The pins 11 and 12 are coaxially arranged and their common axis is the pivot axis between the link 5 and the floor beam 1.

The link 5 extends upwardly and rearwardly from the floor beam to pivot 10 which comprises a pair of lugs 13 and 14 entering recesses 15 and 16 in the rear end portion of the roof lever 4. A pair of coaxial pivot pins 17 and 18 suitably engage through the projections 13 and 14 into the rear end portion of the roof lever 4.

It will be seen that both the link 5 and the roof lever 4 are of substantial breadth and each acts as a shield to prevent entry of loose rubble from the mine roof into the space between the floor beam and the roof lever. A pair of hydraulic jacks 19 are provided which engage pivotally with the floor beam at position 21 and pivotally with the roof lever at position 22. Preferably the jacks 19 are of the double extension kind. The jacks 19 are placed close to the pivot position 6 on the floor beam so that clear space is provided between the free ends of the floor beam and roof lever.

The link 5 may be located in either of two fixed positions about the pivot 6, the position shown in full and dotted lines in FIG. 1 being the rear position and that shown in chain dotted lines being the forward position. For locking, the link is provided with a pair of arcuate projections 23 which are located adjacent to the interior surfaces of the projections 2 and 3. A pin 24 is slidable in each of the projections 23 for engagement in either of a pair of holes 25 or 26 in each of the lugs 2 and 3. Engagement of the pins 24 into the holes 25 locks the link in its rear position and engagement of the pins 24 in holes 25 will lock the link in its forward position.

Each arcuate projection 23 includes an outwardly directed boss 27 engageable with either of two inward projections 28 and 29 formed on each of the projections 2 and 3. The engagement of the boss 27 with either of the projections 28 or 29 helps to locate the link 5 in a suitable position for insertion of the pin 24 to one or other of the holes 25 or 26. Each of the holes 25 and 26 may be of slightly elongated form to assist entry of the pin 24 therein.

To assist in adjustment of the link 5 between its rearward and forward positions, a pair of hydraulic jacks 31 may be provided to act between the floor beam and the link through the medium of suitable pivot connections 32 and 33.

The free end portion of the roof lever 4 is provided with a pair of coaxial pivotal connections 34 on which are mounted a pair of roof beams 35 and 36. The length of the roof lever is such that the free end thereof lies almost vertically over the free end of the floor beam over the majority of the range of adjustment of the roof lever and the roof beams extend considerably further forward than the floor beam. Each roof beam 35 and 36 includes a hydraulic jack 37 to facilitate its angular adjustment about the pivot 34.

The floor beam 1 operates in conjunction with a conveyor carrier 30 which comprises a base member 38 having a pair of vertical support members 39 and 41 secured thereto. The free end of the floor beam 1 is of tapered construction both as regards width and vertical height to fit into a suitable recess 42 in the underside of the member 38. An advancing jack 43 is connected between the vertical member 41 and a suitable anchorage 44 on the floor beam between the projections 2 and 3. The cylinder 45 of jack 43 is directly connected to the upright member 41 through the medium of a universal joint 46. As shown in FIG. 1 the jack 43 is fully extended and as shown in FIG. 2, the jack 43 is fully contracted.

The roof support illustrated is intended for use in a longwall mining system in which a large number of such supports are placed side by side in a row along the working face in a coal mine, the free ends of the floor beams and roof levers facing towards the coal face. The supports 30 carry a chain conveyor of limited flexibility whose function is to carry away coal excavated from the face by a conventional coal-cutting machine located between the conveyor and the face. For each support the jack 19 is maintained under pressure to urge the main roof lever 4 and the roof beams 35 and 36 against the roof. At the same time the advancing jack 43 is actuated to urge the conveyor forwardly to its maximum extent. As coal is removed from the face it becomes necessary to advance the conveyor and supports closer to the newly formed face and for this purpose the supports may be released from the roof one at a time by releasing hydraulic pressure from the jack 19, the advancing jack 43 then being fed with hydraulic liquid to cause it to contract whereby the support is pulled forwardly using the conveyor as an anchorage. The conveyor will be held in position by the roof supports on either side of the roof support undergoing advance. It is important that the conveyor should be well protected from rubble which might fall from the roof after coal is cut away and for this purpose the roof lever 4 and the beams 35 and 36 project forward as far as is reasonably possible to cover the conveyor. The position shown in FIG. 1 offers the minimum reasonable protection since the roof beam 35 does not fully cover the conveyor. However, when the support is advanced further towards the conveyor as in FIG. 2, the roof beam 35 will more than adequately cover the conveyor.

The support illustrated is adaptable for use in coal seams of considerably different thickness but it is necessary before installation of the support at a coal face to make an appropriate adjustment of the link 5 in accordance with the thickness of the coal seam. Where the seam is a thin seam, the link 5 is placed in the illustrated rear position. Where the support is for use in a considerably thicker seam, the link 5 is placed in the forward position where the pins 24 are engaged in the holes 26. Without this adjustment in position for use in a thick seam, upward extension of the roof lever would result in backward arcuate movement of its free end to a position where adequate cover over the conveyor would not be provided. Adjustment of the link 5 into its forward position provides another fixed position for the roof lever pivot 10 which will ensure that for thick seams the forward end of the roof lever and the roof beams adequately cover the conveyor. During setting of the link 5, the jacks 31 are used to cause appropriate movement of the link 5 after removal of pins 24. When the link 5 is set in its appropriate position, determined by engagement of boss 27 with either of projections 28 or 29, pin 24 is inserted into the appropriate hole 25 or 26 and a suitable locking pin 47 is inserted through the head to hold it positively in position.

It will be seen that the forward and the rearward positions for the link 5 provide two fixed positions for the pivot 10, the forward of these two positions being closer to the free end of the roof lever in its raised position than the rearward position of pivot 10.

The location of the pivotal connections 22 between jacks 19 and roof lever 4 is such that substantially the whole roof thrust on beams 35 and lever 5 will pass through jacks 19 leaving only a comparatively small force for transmission through link 5 which may be of a tension or compression force depending on roof conditions. The force necessarily exerted by pins 24 on link 5 will therefore be quite small.

Whilst the described embodiment shows means only to locate the pivot 10 of the roof lever in either of two positions, it is within the scope of the present invention to provide for locking the link 5 in further positions preferably intermediate the forward and rear positions.

Further in the illustrated construction the link 5 has been shown as being lockable in either of two positions to the floor beam 1. It is within the scope of the present invention for the link to be lockable in either of two positions to the roof lever such that normal pivoting of the roof lever during raising and lowering will take place about the pivot which connects the link to the floor beam. In this instance the normal pivoting action of the roof lever during raising and lowering will take place about the link pivot connected to the floor beam but it will be seen that locking of the link to the roof lever will provide the two fixed positions for the pivot of which one is closer to the free end of the roof lever in its fully raised position than the other.

We claim:

1. A mine roof support comprising a floor beam, a roof lever, a link pivotally secured to the floor beam and pivotally secured to the roof lever, the pivot axes being parallel and spaced apart the one from the other along the link, a variable length strut such as a hydraulic jack engaging pivotally between the floor beam and the roof lever at positions spaced from the link to vary the inclination of the roof lever relative to the floor beam over an angular range whereby to vary the spacing between the free ends of the beam and the lever remote from the link, and locking means capable of fixing the link mechanically in anyone of at least two alternative positions relative to the floor beam providing alternative mechanically fixed positions for the roof lever pivot axis.

2. A mine roof support as claimed in claim 1 wherein the link and the lever are both of substantial width so that each forms a shield.

3. A mine roof support as claimed in claim 1 wherein the locking means includes at least one pin insertable through a hole in the link into an over-lapping hole in the floor beam to provide one of said fixed positions.

4. A mine roof support as claimed in claim 1 including a hydraulic jack acting between the link and the floor beam to assist link movement in between said two fixed positions.

5. A mine roof support as claimed in claim 3 including abutment means secured to the floor beam to engage the link at either of the said two fixed positions.

6. A mine roof support comprising a floor beam member, a roof lever member, a link pivotally secured to the floor beam member and pivotally secured to the roof lever member, the pivot axes being parallel and spaced apart the one from the other along the link, a variable length strut such as a hydraulic jack engaging pivotally between the floor beam member and the roof lever member at positions spaced from the link to vary the inclination of the roof lever member relative to the floor beam member over an angular range whereby to vary the spacing between the free ends of the floor beam member and the roof lever member remote from the link and locking means capable of fixing the link mechanically in anyone of at least two alternative positions relative to one member providing alternative mechanically fixed positions for the pivot axis about which the roof lever member may move relative to the floor beam member.

* * * * *